(No Model.)
J. H. E. MENDÈS.
COMPOUND LIQUID FOR USE IN THE ART OF REFRIGERATION.
No. 319,108. Patented June 2, 1885.
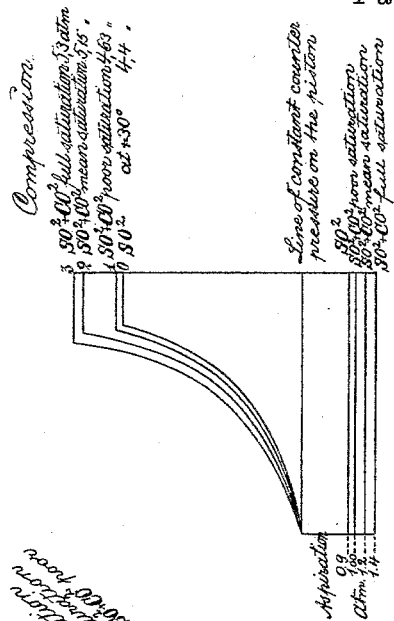
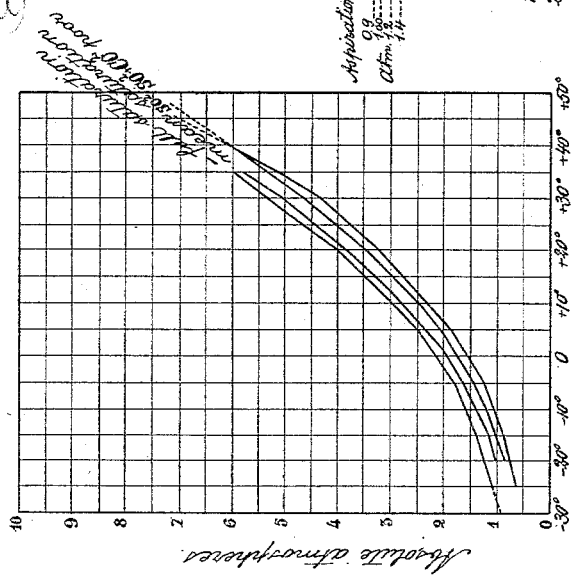
Witnesses:
C. E. Sundgren
Matthew Pollock
Inventor:
J. H. E. Mendès
By his Attys.
Brown & Hall

United States Patent Office.

JOSEPH HENRI ERNEST MENDÈS, OF PARIS, FRANCE, ASSIGNOR TO SOCIÉTÉ ANONYME DITE COMPAGNIE INDUSTRIELLE DES PROCÉDÉS RAOUL PICTET, OF SAME PLACE.

COMPOUND LIQUID FOR USE IN THE ART OF REFRIGERATION.

SPECIFICATION forming part of Letters Patent No. 319,108, dated June 2, 1885.

Application filed April 8, 1885. (No specimens.)

*To all whom it may concern:*

Be it known that I, JOSEPH HENRI ERNEST MENDÈS, a citizen of the Republic of France, residing at Paris, in said Republic, have invented a new and useful Improvement in Compound Liquids for Use in the Art of Refrigeration, of which the following is a specification, reference being had to the accompanying diagrams.

Liquid anhydrous sulphurous acid has its boiling-point at atmospheric pressure about 11° below 0° centigrade. The curve representing its point of liquefaction at different temperatures and under different pressures is represented by the curve 0 of the accompanying Table No. 1. The boiling-point of anhydrous sulphurous acid at atmospheric pressure may be lowered by adding to it, in the state of solution, a certain quantity of carbonic acid. Anhydrous sulphurous acid possesses in effect the property of containing in solution a certain quantity of carbonic acid—a fortieth to a fiftieth of its own weight. By this solution the sulphurous acid acquires new properties, which modify its point of liquefaction at different temperatures and under different pressures, according to the curves 1, 2, and 3 of the accompanying Table No. 1. The curve No. 3 represents the point of liquefaction of anhydrous sulphurous acid saturated with carbonic acid in solution. The boiling-point of the sulphurous acid thus saturated with carbonic acid is lowered at the pressure of the atmosphere to about 30° below 0°. The boiling-point may be varied between −30° and −11°, according to the proportion of carbonic acid dissolved. The result of this state of more or less complete saturation of $SO_2$ by $CO_2$ is a fundamental modification of the properties of $SO_2$. In effect the work necessary to the liquefaction of this new compound (which I call "carbonated sulphurous acid") is, proportionally to the cold produced, greater than the augmentation of work necessitated by the augmentation of the aspired vapors. This augmentation of tension accompanies the dissolution of the carbonic acid. It is known that in this system of machines the quantity of cold produced is, to equal volumes of aspired vapors, proportional to the tension of said vapors. Now, to take an example, the tension of the anhydrous sulphurous acid vapors at a temperature of −15° centigrade is about 0.9 atmospheres. At the same temperature the new saturated liquid attains a tension of 1.4 atmospheres. It may therefore be concluded that for a given volume of aspired vapors the quantity of cold produced is for the new liquid in proportion to sulphurous acid as 1.4 to 0.9. Then a given capacity of pump for aspired vapors of the carbonated sulphurous acid will give an augmentation of production of cold equal to about fifty per cent. On the other hand, the work necessary to the liquefaction of the gases in the condenser of the refrigerating-machines is not proportional to the augmentation of tension of the vapors aspired, or, in other words, to the quantity of cold produced. This is governed according to the accompanying Table No. 2. This table indicates the quantity of work necessary to the liquefaction of the vapors, either of pure $SO_2$ or of $SO_2$ more or less saturated with $CO_2$. In this table I have supposed the vapors aspired at −15° centigrade and compressed at +30° centigrade. It appears from these diagrams that the quantity of work necessary to the liquefaction diminishes for a given unit of cold produced with the augmentation of saturation of $SO_2$ by $CO_2$. The economy of work with the saturated liquid is about ten per cent. of the work necessary to compression. The advantage of the employment of carbonated sulphurous acid is, then, of two kinds: first, for a given quantity of cold produced the dimensions of the compression-pump are reduced; second, it reduces at the same time the quantity of work necessary to the production of cold.

Carbonated sulphurous acid may be obtained by stirring at a low temperature gaseous carbonic acid into the liquid sulphurous acid. This operation may be stopped as soon as the pressure of the saturated liquid is superior for a given temperature to its normal pressure corresponding to the curve No. 3 of the accompanying Table No. 1.

In practice I set the refrigerating-machine in operation with pure anhydrous sulphurous acid, then slowly introduce the carbonic acid into the circulation until the saturation is obtained. I might, however, introduce into the machine sulphurous acid previously carbonated.

The carbonic acid necessary to the saturation may be prepared by any of the known processes.

What I claim as my invention, and desire to secure by Letters Patent, is—

As an improvement in the art of refrigeration, the employment in refrigerating-machines of sulphurous acid more or less saturated with carbonic acid in solution, substantially as and for the purpose herein described.

In testimony whereof I have signed this specification in the presence of two subscribing witnesses.

JOSEPH HENRI ERNEST MENDÈS.

Witnesses:
  ROBT. M. HOOPER,
  C. CRÉMERS.